US008694448B2

(12) United States Patent
Mandelbaum et al.

(10) Patent No.: US 8,694,448 B2
(45) Date of Patent: Apr. 8, 2014

(54) METHOD AND APPARATUS FOR PROVIDING AN ADAPTIVE PARSER

(75) Inventors: Yitzhak Mandelbaum, Highland Park, NJ (US); Donald Caldwell, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 704 days.

(21) Appl. No.: 12/336,018

(22) Filed: Dec. 16, 2008

(65) Prior Publication Data
US 2010/0153322 A1    Jun. 17, 2010

(51) Int. Cl.
*G06F 15/18* (2006.01)
*G06F 9/45* (2006.01)

(52) U.S. Cl.
USPC .......................................... 706/14; 717/143

(58) Field of Classification Search
None
See application file for complete search history.

(56) References Cited

U.S. PATENT DOCUMENTS

| | | | | |
|---|---|---|---|---|
| 6,959,329 | B2 * | 10/2005 | Thakor | 709/220 |
| 7,685,508 | B2 * | 3/2010 | Froyd et al. | 715/222 |
| 7,711,852 | B1 * | 5/2010 | Troan et al. | 709/242 |
| 2006/0291446 | A1 * | 12/2006 | Caldwell et al. | 370/351 |
| 2007/0028000 | A1 * | 2/2007 | Ebbesen et al. | 709/238 |
| 2008/0165801 | A1 * | 7/2008 | Sheppard | 370/465 |

OTHER PUBLICATIONS

Mandelbaum, Yitzhak. "The Theory and Practice of Data Description." 2006.*
Zanolin, Luca; Mascolo, Cecilia; Emmerich, Wolfgang. "Model Checking Programmable Router Configurations with Spin." 2003.*
Caldwell, D., Gilbert, A., Gottlieb, J., Greenberg, A., Hjalmtysson, G., & Rexford, J. (2004). The cutting EDGE of IP router configuration. ACM SIGCOMM Computer Communication Review, 34(1), 21-26.*
Gottlieb, J., Greenberg, A., Rexford, J., & Wang, J. (2003). Automated provisioning of BGP customers. Network, IEEE, 17(6), 44-55.*
Law, KL Eddie, and Achint Saxena. "UPM: unified policy-based network management." Proc. SPIE,(ITCom 2001). vol. 4523. 2001.*
Caldwell, Donald, Seungjoon Lee, and Yitzhak Mandelbaum. "Adaptive parsing of router configuration languages." Internet Network Management Workshop, 2008. INM 2008. IEEE. IEEE, 2008.*

* cited by examiner

*Primary Examiner* — Kakali Chaki
*Assistant Examiner* — Daniel Pellett

(57) ABSTRACT

A method and apparatus for providing an adaptive parser are disclosed. For example, the method receives a configuration for a router, and parses a command from the configuration. The method determines whether there is an existing entry for the command in a model of a configuration language, wherein the model of the configuration language is used to record a syntactic structure of each command in the configuration language and its relationship to other commands. The method creates a new entry for the command in the model of the configuration language, if there is no existing entry for the command; and uses the model to update the parser.

11 Claims, 4 Drawing Sheets

METHOD AND APPARATUS FOR PROVIDING AN ADAPTIVE PARSER

The present invention relates generally to communication networks and, more particularly, to a method and apparatus for providing an adaptive parser for configuring routers in networks, e.g., packet networks such as Internet Protocol (IP) networks, Voice over Internet Protocol (VoIP) networks, Virtual Private Networks (VPN), and the like.

BACKGROUND OF THE INVENTION

Networks and the functionality that they deliver are growing increasingly complex, making network management a steadily growing challenge. There are many aspects to managing a network—from maintenance of its physical infrastructure to planning of its logical architecture. One component of network management is configuration management.

Router configurations capture and reflect all levels of network operation: from the logical structure of the (possibly many) networks, both real and virtual, of which they are a part, to the multi-faceted routing policies of those networks, to the physical links, interface cards and controllers that form the building blocks of the networks that they drive. It is highly challenging to manage the detailed configurations of the potentially huge number of routers that run a network. Yet, looking at a single router reveals little of the entire picture. As a result, router configurations are extremely brittle, where small changes to a single router configuration may have a significant impact on the network as a whole.

However, network operators do not have the luxury of leaving router configurations alone. As networks evolve, both in terms of the users they include and the features they support, router configurations change with them. The pace of network evolution is such that the set of router configurations in a network may change on a daily basis. Manually configuring and analyzing router configurations is highly challenging, and time-consuming for large networks. Network owners, particularly for large networks, devote tremendous resources to ensure that their networks are robust and flexible. For example, the resources may be used for updating software and training personnel. That is, the software must be written, and re-written (or purchased and repurchased, as the case may be), and operators must be trained and retrained to keep up with this constant evolution.

SUMMARY OF THE INVENTION

In one embodiment, the present invention discloses a method and apparatus for providing an adaptive parser. For example, the method receives a configuration for a router, and parses a command from the configuration. The method determines whether there is an existing entry for the command in a model of a configuration language, wherein the model of the configuration language is used to record a syntactic structure of each command in the configuration language and its relationship to other commands. The method creates a new entry for the command in the model of the configuration language, if there is no existing entry for the command; and uses the model to update the parser.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing an adaptive parser for configuring routers in networks. Although the present invention is discussed below in the context of Internet Protocol (IP) networks, the present invention is not so limited. Namely, the present invention can be applied for other types of packet networks.

Figure 1:
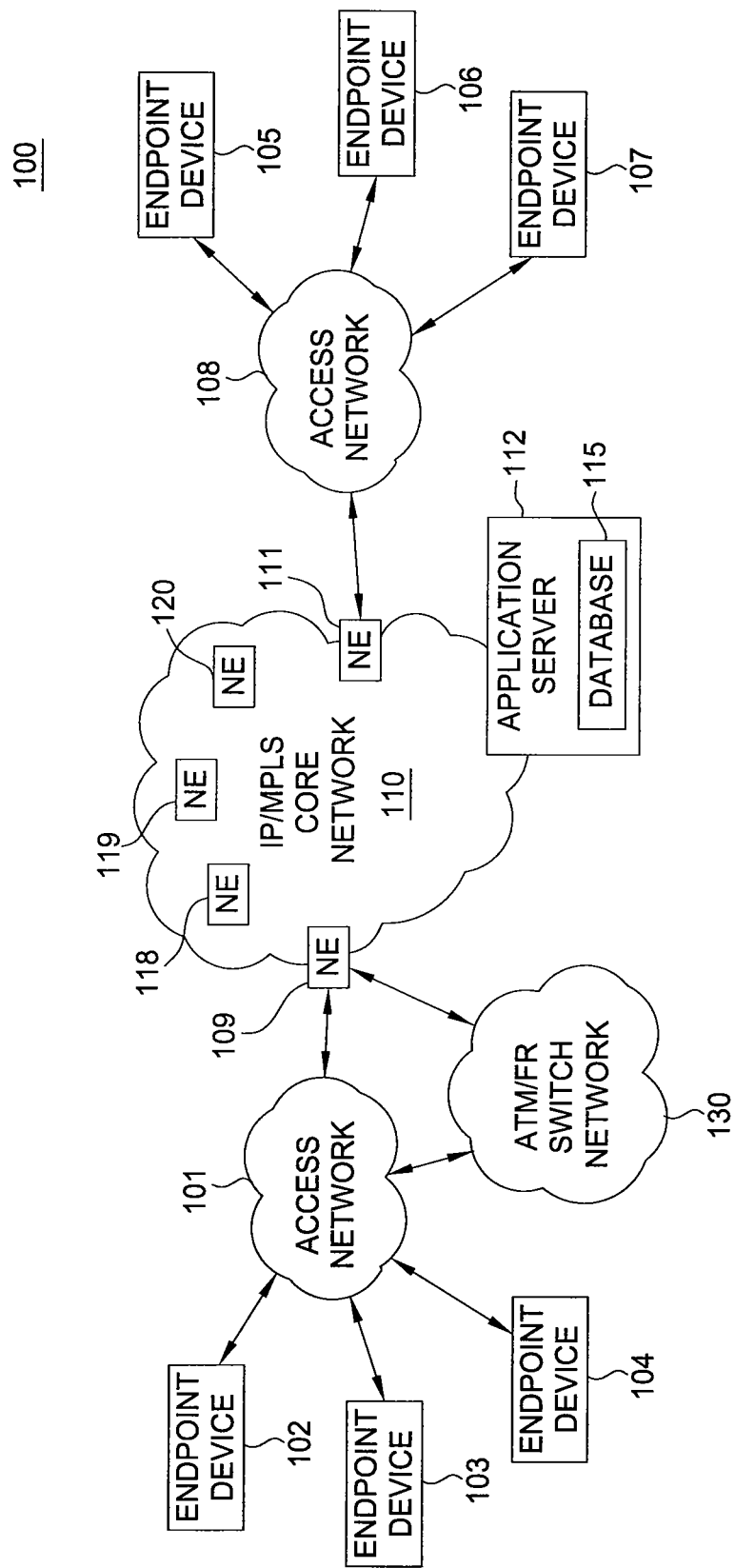
FIG. 1 illustrates an illustrative network related to the present invention.

FIG. 1 is a block diagram depicting an illustrative packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a 3$^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication network 100 may be expanded by including additional endpoint devices, access networks, network elements, and/or application servers, without altering the scope of the present invention.

The above IP network is described to provide an illustrative environment in which packets for voice, data and multimedia services are transmitted on networks. A network service provider may manually perform a network configuration, e.g., a router configuration, in a network. A router configuration refers broadly to a detailed specification as to how a router will be configured to operate within the network, which in turn determines the router's behavior. In essence, the router configuration is a representation of a sequence of specific commands that if typed through the router's Command Line Interface (CLI), would determine a wide set of interdependent operations in the router hardware and software. For example, service provider personnel may configure the routers (e.g., NEs 109, 111, 118, 119, and 120) in a network using each router's CLI. However, having service provider personnel configure routers for each change, e.g., due to customer orders, network events, network expansion, etc., is very costly, and time consuming for large networks.

In one embodiment, the current invention provides an adaptive parser for configuring routers. In one example, the adaptive parser can be used for configuration management in an evolving network environment. A configuration management tool may perform several tasks including but not limited to: (1) dealing with router specific configuration details, (2) performing common configuration processing (e.g., generating topology information), (3) providing higher-level tools with uniform interfaces for accessing entire configuration information, and (4) helping those tools focus on their own objectives without dealing with highly complicated router-specific details.

For example, a Border Gateway Protocol (BGP) analysis tool may retrieve the details for BGP configuration through a well-defined interface of the configuration management tool and the BGP analysis tool does not need to know whether BGP configuration commands are different across vendors (e.g., router vendors such as Cisco of San Jose, Calif., and Juniper of Sunnyvale, Calif.).

Figure 2:
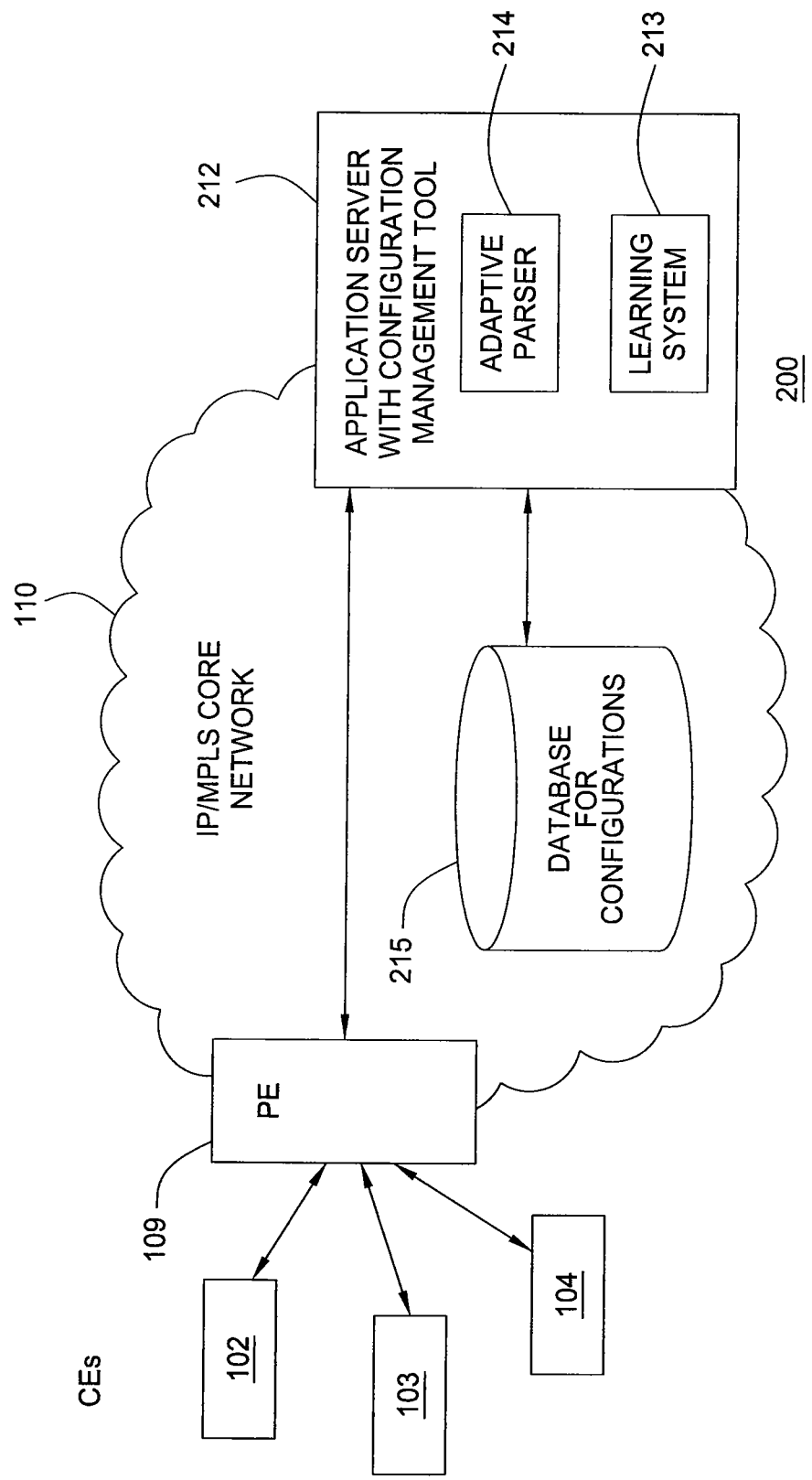
FIG. 2 illustrates an illustrative network of the current invention for providing an adaptive parser for configuring routers.

FIG. 2 illustrates an exemplary network 200 with the current invention for providing an adaptive parser for configuring routers. For example, customer Edge (CE) routers 102-104 are accessing services from IP/MPLS core network 110 through a PE router 109. The IP/MPLS core network 110 also includes an application server 212 and a database for storing configurations 215.

In one embodiment, the service provider implements a configuration management tool in the application server 212. The configuration management tool also comprises an adaptive parser 214. The application server 212 stores configurations for one or more routers in the database 215.

For example, a customer using CE router 102 may interact with the application server 212 and request a change in a network configuration. For example, an IP Virtual Route Forwarding (VRF) table for the customer may be modified. If the configuration file contains only known commands, the received configuration file from the customer may then be parsed via the adaptive parser 214. If there are unknown commands, the parser will need to be updated.

In order to more clearly describe the current method for providing an adaptive parser, the components of the configuration management tool will first be described. The configuration management tool comprises two components: a learning system 213 for determining the configuration language of a router, and an adaptive parser 214 built on top of the learning system 213. That is, the adaptive parser leverages the learning system to improve its ability to parse configurations as the network evolves over time.

In one embodiment, the learning system infers an approximation of the configuration language for a router based on a set of selected, valid configuration files. The configuration files have a syntactic structure that reflects the logical command-independent structure of configurations. For example, a section of a configuration file may be formatted such that members of the section are indented more than the command that begins the section. That is, the physical (printed) format of the configuration file may accurately capture the implicit logical format. However, the format is an approximation of the actual configuration language as it is not based on all valid configurations. For example, the actual configuration language may contain a superset of valid configurations. Analyzing every valid configuration is not practical for large networks. Therefore, configurations that may be used for training the learning system need to be carefully selected.

In one embodiment, the learning system 213 comprises components for providing: valid input configurations, command independent approximate format, command dependent approximate format, and a model of the configuration language format.

The valid input configuration component contains configuration files that can be used for training a format inference engine. Namely, the files contain only valid configurations and language with intact indentation for ease in parsing. The valid configurations should also be representative of the configuration files on the network of interest.

The component for the command independent approximate format may be referred to as the "general" format as it works on any of the configuration languages. The general format captures the known knowledge of an underlying meta-structure of the configuration language. For example, the description may capture low-level, tokenization structure of the configuration or high level, structures of the entire configuration. In another example, the general format may capture the description of the command and sectioning structure; in particular, the multiple different syntactic forms of sections. In contrast to the general format described above, the component for the command dependent approximate format may be referred to as "specific" format.

The component for a model of the configuration language format records the syntactic structure of each command and its relationship to other commands. For example, the configuration language format may be represented in a tree shaped data structure. The root of the tree may represent the configuration itself. The remaining nodes each may represent a particular command. The tree structure then implicitly encodes the relationships between commands: the children of a particular node represent the valid subcommands of the represented command. The remaining information about the command is included in the node itself. In particular, the node carries the command name and its type: a simple command or one of the complex, section commands.

The model may then begin by generating a parser for top-level commands from the general format descriptions derived from valid configuration files. For example, the configuration management tool may iteratively parse the configuration files by parsing one top-level command at a time. The iterative nature of the processing allows the method to process large configuration files without bringing the entire configuration into memory, thereby increasing the scalability of the configuration management tool.

In the process of parsing, the parser classifies each command according to its syntactic representation and tags it accordingly. Also, the in-memory representation of the parsed commands is organized into a tree-shaped structure. The difference is that the model has at most one entry for any given command, whereas the parsed data has as many entries as there are appearances of the command within its respective section (or the configuration itself, if it is a top level command).

Once a top level command has been parsed, the method looks up the command in the model. If it is a new command, then a new entry is created in the model for that command. If the command already exists, then the existing entry is updated and checked for consistency with the newly parsed data. Either way, the method iterates through all of the commands in a given section and recursively updates each one.

Once all of the commands in a configuration have been processed, the resulting model comprises a tree that logically represents the elements of the configuration that has been encountered so far. The method then converts this knowledge into a readable language, e.g., a human-and-machine readable language. For example, the learning system of the current invention generates a formal description of the inferred configuration language in a Data Description Language (DDL)—a human-and-machine readable data description language.

In one embodiment, the learning system relies upon a repository of domain knowledge about the routers both to parse the training configurations for inferring the configuration language, and to guide the generation of the description of the inferred configuration language. The repository of domain knowledge about the routers is used so that the resulting structure (in DDL format) is predictable and human-readable. These characteristics are useful in facilitating further configuration processing and analysis.

In one embodiment, the data description language may be Processing D-Hoc Data Sources targeted at the ML programming language (PADS/ML). PADS/ML is a data description language designed for concise and declarative description of legacy data formats, including those for which no context-free grammar exists. The support of legacy data formats by PADS/ML goes beyond its description language. For example, PADS/ML may generate many essential software artifacts from a description, including but not limited to: a data structure for representing parsed data in memory, a recursive-descent parser, a printer, and a data validator.

All software artifacts are generated as source code in Objective CAML (OCAML)—a safe general-purpose programming language supporting functional, imperative and object oriented programming. In addition to generating software, PADS/ML provides a framework for developing generic tools in OCAML whose functions operate on any description derived data structure, regardless of its type.

PADS/ML does the work of specializing generic tools written in its framework to the particular data structures derived from a description. The extensive, end-to-end support that PADS/ML provides for processing legacy data formats makes it useful for addressing the challenges of the configuration language. A PADS/ML description specifies the physical layout and semantic properties of an ad hoc data source. These descriptions are formulated using types. Base types describe atomic data, such as ASCII-encoded, 8-bit unsigned integers (puint 8), binary 32-bit integers (pbint32), dates (pdate) and strings (pstring). Certain base types take additional OCAML values as parameters. For example, pstring (c) describes strings that are immediately followed by the character c. Literal values (conceptually, singleton types) describe exactly themselves.

Structured types describe compound data, and are built using ML-like type constructors. For example, records and tuples (records with unnamed fields) describe fixed length sequences of data with elements of different types. Datatypes (or variant types) describe elements of a format where multiple alternative types of data may appear. Lists describe homogeneous sequences of data and type constraints describe data satisfying arbitrary programmer-specified semantic conditions—for example, that a string has at least ten characters.

Users may define their own type constructors using polymorphic types—types parameterized by other types, and dependent types—types parameterized by values. Many of the built-in base types are examples of dependent types. There are also a variety of built-in polymorphic types; most notably, plist, poption and precord. Type plist, a polymorphic, dependent description of lists, has three parameters: on the left, a type parameter: its element type; on the right, a value parameter: a pair of an optional separator that delimits list elements, and an optional terminator. Type poption describes optional data of a particular type and precord describes a logical data "record." In most cases, a newline-terminates a sequence of data. The explicit demarcation of records is useful in error reporting, error recovery and I/O buffering.

Once, the formal description of the inferred configuration language is created in PADS/ML, the adaptive parser leverages the learning system to adapt to changes in the configuration language. That is, the adaptive parser evolves with the network to account for new elements in router configurations by leveraging the learning system. For example, when configurations with unrecognized commands are encountered, the parser may invoke the learning system to update the previous description of the inferred configuration language with knowledge of the new commands. Similarly, as features are added to the routers, the parser is able to effectively and predictably parse the configurations for the new features into data structures or data formats that are suitable for use in downstream processing and analysis.

In one embodiment, the adaptive parser then translates the descriptions of the inferred configuration language into a range of formats suitable for downstream processing. In one embodiment, the descriptions of the inferred configuration language may be translated to eXtensible Markup Language (XML).

In one example, routers may run Cisco Internetwork Operating System (IOS)—an operating system made by Cisco for integrating routing, switching, internetworking, and telecommunications functions in routers. The routers running Cisco IOS are configured using IOS commands. The set of IOS commands and their syntax then constitute the IOS language. Collections of IOS commands may then be referred to as IOS configurations.

The IOS language is declarative and its basic element is a command. There are simple IOS commands, whose influence does not extend beyond a line, and mode IOS commands, which change the state of the command interpreter. Each mode has a restricted set of allowable commands, which may be simple commands or mode commands. Table-1 provides an example of a section from an IOS configuration file.

TABLE 1 key chain kcname
   key 2
      key-string 3 04FEEDDADBADBEEF123
!
class-map match-any classname
   description "Class description"

TABLE 1-continued

```
      match ip dscp cs6
      match ip dscp cs7
   !
   policy-map interfacename_input
      class classname
         police cir 12800 bc 2400 be 4800
            conform-action transmit
            exceed-action set-prec-transmit 4
   !
   interface POS2/0
      description interface description
      ip vrf forwarding 123 : 123
      ip address 135.12.34.65 255.255.255.252
      ip accounting precedence input
      pvc 0/1919
         service-policy input interfacename_input
      !
   router ospf 12
      log-adjacency changes
      area 0 authentication message-digest
      network 135.12.34.64 0.0.0.3 area 0
      maximum-paths 6
   !
   router bgp 7018
      neighbor 12.23.34.45 activate
      neighbor 12.23.34.45 send-community
      neighbor 12.23.34.45 route-map InRMName in
      neighbor 12.23.34.45 route-map OutRMName out
   !
   rtr key-chain kcname
   !
   banner exec. +
   =============WARNING=================
   This system is intended strictly for use by authorized users.
   +
```

In Table-1, {key-string} in line 3 and {description} in line 6 are simple commands while {key} and {class-map} are mode commands. The portion of the configuration in which a mode is active is referred to as a section. Commands may have arguments which set particular parameters of the router operating system. For example, the {area} command in the {router ospf} section in Table-1 specifies the authentication method to use in OSPF area 0.

The above description of IOS command may capture its logical, command-independent structure. However, the logical structure is not expressed in configurations in a consistent manner across all commands. Rather, a set of several common, complex syntactic structures exist, all expressing the same logical structure. In addition, some commands may have their own, unique structure, shared by no other commands. Table-1 includes several examples of complex structures in an IOS configuration. The structure also includes formats that make parsing difficult.

In one example, sections do not have a clear end. For example, interface, router ospf, and router bgp in Table-1 do not have a clear end. In these cases, a parser may either use indentation for clues, know the set of commands that implicitly indicate that the section has ended, or know the set of commands allowed in each section after consulting a manual.

In one example, each command has its own format. For example, each organization responsible for a router function may design its own command structure to be stitched into larger recursive descent parser. Some commands are followed by a set of key/value pairs, others by a mixture of key/value pairs and positional parameters (parameters whose meaning depends on their position, like a UNIX shell command), and yet others have wholly positional parameters.

In one example, a command may have an irregular format. While most simple commands are on a single line, some IOS commands define argument data on lines after the command (i.e., not just as arguments to a command). One example is the warning banner command (shown at the end of Table-1) in which the text of the banner message is delimited by some character, and whose purpose is to specify the banner shown to users upon login and other activities. The {police} command in the {policy-map} section in Table-1 exhibits a different type of irregularity. Although the indentation of the following two lines makes {police} appear to be a mode command, they are in fact arguments to the simple command of {police}, for which Cisco routers occasionally insert line breaks for pretty printing. Another example of irregular format is ttycap, whose purpose is similar to a UNIX termcap entry.

In one example, one token may not be enough to distinguish a command. While in most cases, a command is distinguished by its first token, some commands, most notably {IP} and {router} can only be disambiguated by additionally consuming the next token. These commands may be referred to as two-dependency commands, because classifying the command depends on two tokens.

In one example, the language (IOS) may not be context-free. For example, the warning (banner command) in Table-1, may not be modeled using a context-free grammar.

Table-2 provides an example IOS in PADS/ML for an ip vrf section from an IOS configuration file. Table-3 provides a simplified description of the ip-vrf in Table-2.

TABLE 2

```
ip vrf 1023
   description VPN for Best Bank of America
   route-target import 100:3
   route-target import 117:7
   route-target export 119207 : 15144
   export map To_NY_VPN
   maximum routes 150 80
```

TABLE 3

```
ptype rt_type = E of "export" | I of "import"
ptype route_target = rt_type * ' ' * pint * ':' * pint
ptype max_routes = {
   "maximum routes " ;
   limit: pint:
   ' ' ;
   warn_threshold: [p : pint | 0 <= p & p <= 100];
}
ptype ip_vrf_member =
   Export        of "export map "* pstring ( '\n ' )
   | Description of "description "* pstring ( '\n ' )
   | Route_target of "route-target "* route_target
   | Max_routes of "maximum routes "* max_routes
ptype ip_vrf = {
   cmd : ("ip vrf "* pint) precord;
   subcmds : ip_vrf_member precord
                 plist (no_sep, Error_term)
```

The description in Table-3 is a sequence of type definitions, with definitions appearing before use. Therefore, the description is best read from bottom up. The last definition, ip_vrf, describes the entire section using a record type constructor.

The record has two fields: {cmd} describing the starting command of the section, and {subcommands} describing the section members. The type of {cmd} starts with the string literal "ip vrf" and ends with an integer identifier. The two are sequenced using the tuple constructor * and grouped together as one logical record. The {subcommands} field is described as the longest possible list of valid (error-free) ip vrf member records. The method uses a plist whose elements have no separator (No_sep) and that terminates when it encounters an element with an error (Error_term). The set of possible plist separators and terminators (including No_sep and Error_term) are defined along with plist in the library of built-in base types.

The previous type, ip_vrf_member, describes the set of valid commands for that section using a datatype constructor, with one alternative for each valid command. The syntax of datatypes follows that of OCAML, where for each variant of the datatype, a name (in uppercase) is specified followed by the type of the variant; variants are separated with a vertical bar. The order of variants is significant: the parser attempts each variant in order, backtracking on failure to try the next variant. This semantics differs from similar constructs in regular expressions and context-free grammars, which non-deterministically choose between alternatives.

The max_routes type describes the maximum routes command, which has two parameters. The first parameter specifies an integer limit on the number of routes allowed for this VRF. The second parameter describes a threshold number of routes, specified as a percentage of a limit, after which a warning is issued. To express the fact that this field encodes a percent, the method uses a type constraint to constrain its value to between 0 and 100. The remaining types use type constructors that have already been discussed above.

Running the learning system on the commands in Table-2 results in the inferred descriptions for ip vrf shown in Table-4. The first line opens the auxiliary description of shared types so that subsequent lines can import particular elements of that description. Next begins the definition of the ip section, followed immediately by the beginning of the vrf subsection. The treatment of vrf as a subsection is caused by the description of ip as a "two-dependency" section in the general IOS description.

Next comes the description of vrf's members, with route-target annotated to indicate that its name has been escaped ('-' replaced by ','). The section description concludes much like shown in Table-3, although it uses the imported standard_section type rather than a simple plist. The description of the ip section includes only one inferred child, vrf, and specifies that ip is a two-dependent section. The description of the entire configuration contains the expected members {ip} and {other} and a new, catchall member {unparsed}, for any lines formatted like commands, but not recognized as belonging to any configuration members. The underbar '_' is a wildcard pattern in OCAML, matching any value of the discriminant.

TABLE 4

```
(* *** Output by meta_cisco_v3, version 3.4 *** *)
open Cisco_utils
pextern cisco_command (name:string)
pextern cisco_unparsed
pextern delimited_banner
pextern data_selection
pextern (cmd_set) cmd_lookahead
pextern (cmd_set) standard_section
pextern (cmd_set) two_dep_section (first_dep:string)
(* *** BEGIN SECTION config_ip *** *)
(* *** BEGIN SECTION config_ip_vrf *** *)
ptype config_ip_vrf_description = cisco_command precord
ptype config_ip_vrf_export = cisco_command precord
ptype config_ip_vrf_maximum = cisco_command precord
(* *** [NAME : route-target] *** *)
ptype config_ip_vrf_route ' target = cisco_command precord
ptype config_ip_vrf_members (next_cmd : string) =
   pmatch next_cmd with
       "description" -> Description of
                          config_ip_vrf_description
       |"export" -> Export of config_ip_vrf_export
       |"maximum" -> Maximum of config_ip_vrf_maximum
```

TABLE 4-continued

```
       |"route-target" -> Route ' target of
                          config_ip_vrf_route ' target
       |" "-> Other of pstring _SE (peor) precord
   ptype config_ip_vrf =
       config_ip_vrf_members standard_selection
(* *** END SECTION config_ip_vrf *** *)
ptype config_ip_members (next_cmd:string) =
   pmatch next_cmd with
       "vrf" -> Vrf of config_ip_vrf
       |" "-> Other of pstring_SE (peor) precord
   ptype config_ip =
       config_ip_members two dep_section ("ip")
(* *** END SECTION config_ip_ *** *)
ptype config_members (next_cmd:string) =
   pmatch next_cmd with
       "ip" -> Ip of config_ip
       |" "-> Other of pstring_SE (peor) precord
       | _ -> Unparsed of cisco_unparsed precord
   ptype config = config_members cmd_lookahead
                    plist (No_sep, EOF_term)
```

The adaptive parser may then translate the inferred descriptions to XML for downstream processing. Table-5 provides an example of XML translation for the ip vrf.

TABLE 5

```
<Config>
   <IpVrf>
       <Cmd>ip vrf 1023</Cmd>
       <Description>
           <Cmd>description VPN for Best Bank of America</Cmd>
       </Description>
       <Route-target>
           <Cmd>route-target import 100:3</Cmd>
       </Route-target>
       <Route-target>
           <Cmd>route-target import 117:7</Cmd>
       </Route-target>
       <Route-target>
           <Cmd>route-target export 119207:15144</Cmd>
       </Route-target>
       <Export>
           <Cmd>export map To_NY_VPN</Cmd>
       </Export>
       <Maximum>
           <Cmd>maximum routes 150 80</Cmd>
       </Maximum>
   </IpVrf>
   </Config>
```

Although the current method for providing an adaptive parser for configuring a router is illustrated using an exemplary configuration for a Cisco Internetwork Operating System (IOS), those skilled in the art would realize that the learning system and adaptive parser are applicable to other router configuration languages. As such, the above example is not intended to limit the implementation to a specific configuration language or a specific type of router.

Figure 3:
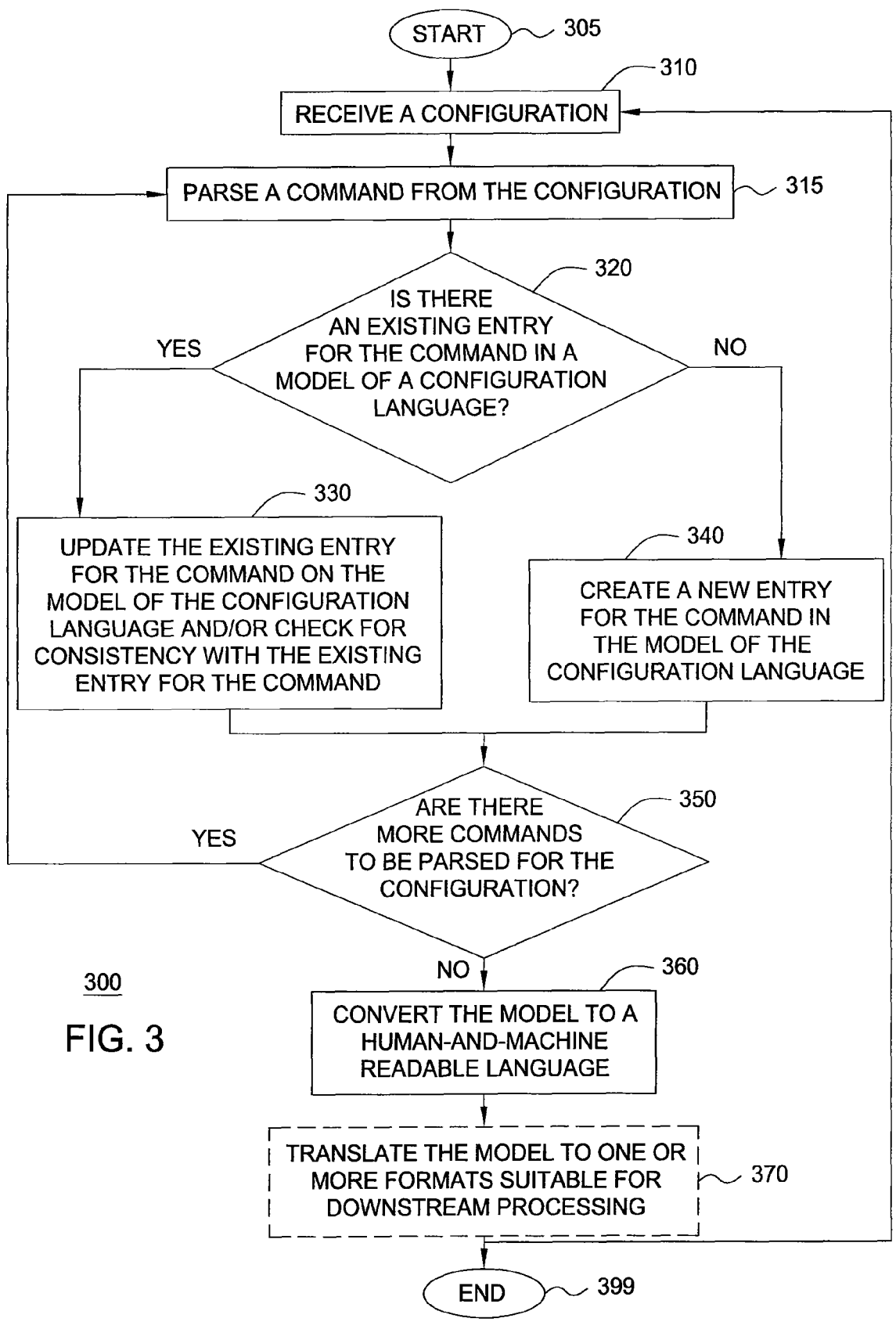
FIG. 3 illustrates a flowchart of a method for providing an adaptive parser for configuring routers.

FIG. 3 illustrates a flowchart of a method 300 for providing an adaptive parser for configuring routers. Method 300 starts in step 305 and proceeds to step 310.

In step 310, method 300 receives a configuration. For example, the method receives a configuration file containing one or more commands.

In step 315, method 300 parses a command from the configuration. For example, the method may have received multiple top-level commands in step 310. The method may then parse one top-level command at a time.

In step 320, method 300 determines whether there is an existing entry for the command in a model of a configuration language, wherein the model of the configuration language is used to record the syntactic structure of each command in the configuration language and its relationship to other commands. In one embodiment, the model of the configuration language is recorded in a tree structure. If there is an existing entry for the command, the method proceeds to step 330. Otherwise, the method proceeds to step 340.

In step 330, method 300 updates the existing entry for the command in the model of the configuration language and/or checks for consistency with the existing entry for the command. The method then proceeds to step 350.

In step 340, method 300 creates a new entry for the command in the model of the configuration language. For example, the method determines an appropriate location for the command in a tree structure and appends the tree structure accordingly. The method then proceeds to step 350.

In step 350, method 300 determines if there are more commands to be parsed for the configuration. If there are more commands to be parsed, the method proceeds to step 315. Otherwise, the method proceeds to step 360.

In step 360, method 300 converts the model to a readable language, e.g., a human-and-machine readable language. For example, the method converts the model to a Data Description Language (DDL). In one embodiment, the DDL may be PADS/ML. In one embodiment, the adaptive parser can be updated or created with the most recent IOS description, thereby allowing the adaptive parser to parse any new commands.

In optional step 370, method 300 translates the model to one or more formats suitable for downstream processing. For example, the method may translate the model to eXtensible Markup Language (XML). The method then returns to step 310 to continue receiving configurations, or ends in step 399.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
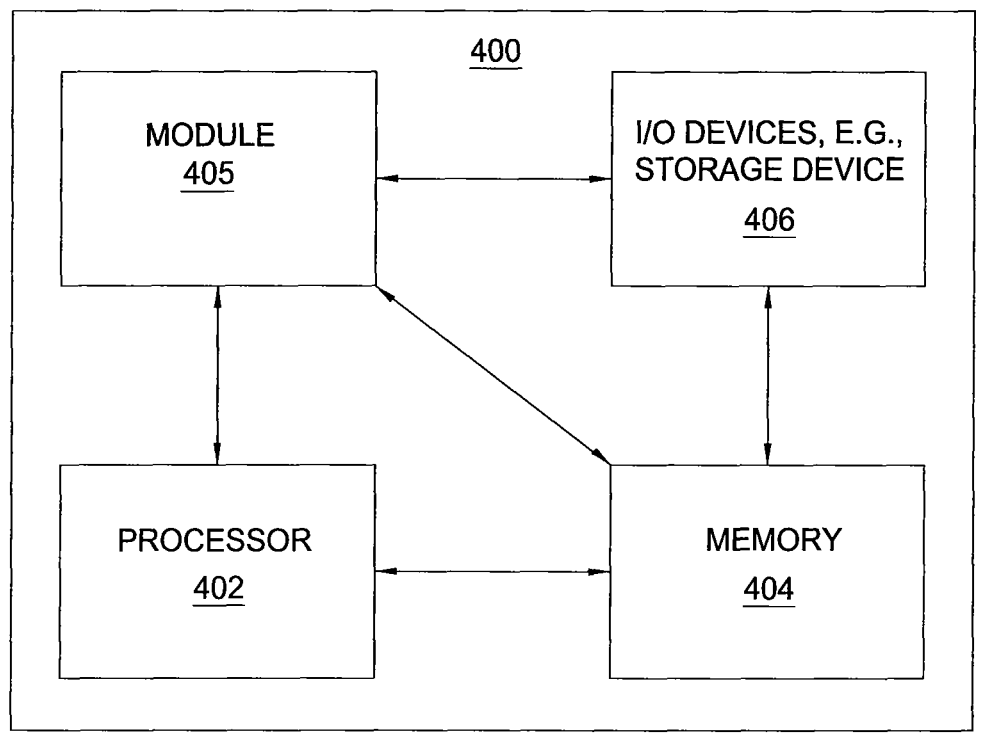
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing an adaptive parser for configuring routers, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing an adaptive parser for configuring routers can be loaded into memory 404 and executed by processor 402 to implement the functions as discussed above. As such, the present method 405 for providing an adaptive parser for configuring routers (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a parser, comprising:
receiving, via a processor, a configuration file for a router from a customer edge router, wherein the configuration file comprises a plurality of commands, wherein the customer edge router is used to access a service from a core network through a provider edge router;
parsing, via the processor, a command from the configuration file;
determining, via the processor, whether there is an existing entry for the command in a model of a configuration language, wherein the model of the configuration language is used to record a syntactic structure of each command in the configuration language and its relationship to other commands, wherein the model of the configuration language is recorded in a tree structure;
creating, via the processor, a new entry for the command in the model of the configuration language, when there is no existing entry for the command;
converting, via the processor, the model of the configuration language to a human-and-machine readable language, wherein the human-and-machine readable language comprises a data description language, wherein the data description language comprises a processing ad-hoc data sources markup programming language; and
using, via the processor, the model that has been converted to update the parser.

2. The method of claim 1, further comprising:
updating an existing entry for the command in the model when there is an existing entry for the command.

3. The method of claim 1, further comprising:
checking for consistency with an existing entry for the command, when there is an existing entry for the command.

4. The method of claim 1, further comprising:
translating the model to a format suitable for downstream processing.

5. The method of claim 4, wherein the format comprises an extensible markup language format.

6. A tangible computer-readable medium storing a plurality of instructions which, when executed by a processor, cause the processor to perform operations for providing a parser, the operations comprising:
receiving a configuration file for a router from a customer edge router, wherein the configuration file comprises a plurality of commands, wherein the customer edge router is used to access a service from a core network through a provider edge router;
parsing a command from the configuration file;
determining whether there is an existing entry for the command in a model of a configuration language, wherein the model of the configuration language is used to record a syntactic structure of each command in the configuration language and its relationship to other commands, wherein the model of the configuration language is recorded in a tree structure;

creating a new entry for the command in the model of the configuration language, when there is no existing entry for the command;

converting the model of the configuration language to a human-and-machine readable language, wherein the human-and-machine readable language comprises a data description language, wherein the data description language comprises a processing ad-hoc data sources markup programming language; and using the model that has been converted to update the parser.

7. The tangible computer-readable medium of claim 6, further comprising:

updating an existing entry for the command in the model when there is an existing entry for the command.

8. The tangible computer-readable medium of claim 6, further comprising:

checking for consistency with an existing entry for the command, when there is an existing entry for the command.

9. The tangible computer-readable medium of claim 6, further comprising:

translating the model to a format suitable for downstream processing.

10. The tangible computer-readable medium of claim 9, wherein the format comprises an extensible markup language format.

11. An apparatus for providing a parser, comprising:

a processor; and a computer-readable medium storing a plurality of instructions which, when executed by the processor, cause the processor to perform operations, the operations comprising:

receiving a configuration file for a router from a customer edge router, wherein the configuration file comprises a plurality of commands, wherein the customer edge router is used to access a service from a core network through a provider edge router;

parsing a command from the configuration file;

determining whether there is an existing entry for the command in a model of a configuration language, wherein the model of the configuration language is used to record a syntactic structure of each command in the configuration language and its relationship to other commands, wherein the model of the configuration language is recorded in a tree structure;

creating a new entry for the command in the model of the configuration language, when there is no existing entry for the command;

converting the model of the configuration language to a human-and-machine readable language, wherein the human-and-machine readable language comprises a data description language, wherein the data description language comprises a processing ad-hoc data sources markup programming language; and using the model that has been converted to update the parser.

* * * * *